United States Patent
Fujino et al.

(10) Patent No.: US 7,224,574 B2
(45) Date of Patent: May 29, 2007

(54) ELECTRIC DOUBLE LAYER CAPACITOR

(75) Inventors: Takeshi Fujino, Wako (JP); Byoungju Lee, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/373,258

(22) Filed: Mar. 13, 2006

(65) Prior Publication Data

US 2006/0209493 A1    Sep. 21, 2006

(30) Foreign Application Priority Data

Mar. 18, 2005    (JP)    ............... 2005-079129

(51) Int. Cl.
*H01G 9/00*    (2006.01)

(52) U.S. Cl. ............... 361/502; 361/503; 361/504; 361/508; 361/512; 361/516

(58) Field of Classification Search ........ 361/502–504, 361/508–512, 523–525, 528–534, 516–519; 29/25.01, 25.03; 502/159
See application file for complete search history.

(56) References Cited

U.S. PATENT DOCUMENTS 6,327,136 B1 * 12/2001 Meguro et al. ............. 361/502
6,522,522 B2 * 2/2003 Yu et al. .................... 361/502
6,528,211 B1 * 3/2003 Nishimura et al. ....... 429/231.8
6,580,599 B2 * 6/2003 Matsuo ...................... 361/504
6,671,165 B1 * 12/2003 Nakazawa et al. ......... 361/502
6,914,768 B2 * 7/2005 Matsumoto et al. ........ 361/502
7,099,146 B2 * 8/2006 Kobayashi et al. ......... 361/523

FOREIGN PATENT DOCUMENTS

| JP | 09-275042 A | 10/1997 |
| JP | 10-121336 A | 5/1998 |
| JP | 2001-217150 A | 8/2001 |
| JP | 2002-015958 A | 1/2002 |
| JP | 2002-134369 A | 5/2002 |
| JP | 2004-006803 A | 1/2004 |
| JP | 2004-146610 A | 5/2004 |

* cited by examiner

*Primary Examiner*—Nguyen T. Ha
(74) *Attorney, Agent, or Firm*—Arent Fox LLP

(57) ABSTRACT

An electric double layer capacitor in which gas generation due to decomposition of a solvent of an electrolyte solution in the capacitor is reduced and performance maintaining ratio is superior, is provided by a method which is different from a method of adding additives to the electrolyte solution. The electric double layer capacitor has activated carbon polarizing electrodes and a non-water-based solvent, and a positive electrode of the activated carbon polarizing electrodes contains an antacid agent.

12 Claims, 2 Drawing Sheets

ELECTRIC DOUBLE LAYER CAPACITOR

BACKGROUND OF INVENTION

1. Technical Field

The present invention relates to electric double layer capacitors having large capacitance and high power, and in particular, relates to a technique to prevent gas generation due to decomposition of the electrolyte solution used in the capacitor.

2. Background Art

An electric double layer capacitor has characteristics such as long service life, high cycling characteristics, characteristics of charge and discharge with large current, and wide range of operating temperatures since there are no chemical reactions during charge and discharge of the capacitor as there are in a conventional secondary battery. Therefore, this type of capacitor is attracting much attention as a new type of storage battery or as a driving power supply for automobiles and devices. In particular, electric double layer capacitors having large capacity and high power are being developed.

As an example of such an electric double layer capacitor, a button-type electric double layer capacitor is shown in FIG. 1. As shown in FIG. 1, the capacitor 1 includes a case 2, a pair of polarizing electrodes 3 and 4 contained in the case 2, a spacer 5 disposed between the electrodes, and electrolyte solution filled in the case 2. The case 2 includes an aluminum body 7 having an opening part 6 and an aluminum cover plate 8 which closes the opening part 6. A part between the outer circumference of the cover plate 8 and inner circumference of the body 7 is sealed with a sealing material 9. The polarizing electrodes 3 and 4 include a mixture of an activated carbon for an electrode, conductive filler, and binder.

Conventionally, as the electrolyte solution used as a material of the electric double layer capacitor, a water-based electrolyte solution and a non-water-based electrolyte solution can be mentioned. In particular, since high voltage use is required to improve energy density of the electric double layer capacitor, the non-water-based electrolyte solution which can be charged and discharged at relatively high voltage has been widely used. As the non-water-based electrolyte solution, a solution in which various conditions such as low-temperature property, solubility of salts, dielectric constant, safety, electrolyte solution decomposition property, boiling point, cost and the like are improved is required. As a material which meets these requirements, an electrolyte solution in which propylene carbonate is mainly used as a solvent and a quaternary ammonium salt is added as a supporting salt, may be mentioned.

However, in the electric double layer capacitor having an electrolyte solution containing propylene carbonate and an alkali activated carbon, in the case in which it is charged and discharged repeatedly under high voltage, the electrolyte solution is gradually decomposed by an electric current and gas is generated. The pressure inside the capacitor is increased by the gas generation, and the capacitor case may be deformed or broken. Furthermore, as a result of consumption of the electrolyte solution by the electrolysis, capacitance may be deteriorated.

To solve such problems, methods in which various types of materials are added to reduce decomposition of the electrolyte solution have been suggested. Practically, a non-water-based electrolyte solution containing γ-butyrolactone or γ-valerolactone in which electrolysis is reduced (see Japanese Unexamined Patent Application Publication No. 2001-217150), a non-water-based electrolyte solution containing fluorobenzene (see Japanese Unexamined Patent Application Publication No. 2004-6803), a non-water-based electrolyte solution containing diphenyls (see Japanese Unexamined Patent Application Publication No. 2004-146610) and the like are disclosed.

However, in these solvents, the effect of restraining gas generation is insufficient. In addition, dehydration and purification of the additives are required to add the additives to the electrolyte solution, and the cost is increased by the solution containing multiple components.

SUMMARY OF THE INVENTION

The present invention was completed in view of the above-described circumstances, and an object of the present invention is to provide electric double layer capacitors in which energy density is high, initial efficiency is superior, gas generation by decomposition of the electrolyte solution of the capacitor is reduced, and efficiency maintaining ratio is superior, by a method other than a method of adding additives to the electrolyte solution.

The inventors performed researched regarding this problem, and it became obvious that the gas generation is caused by an acidic material generated at the positive electrode, and that gas generation in the electrolyte solution is greatly reduced and durability characteristics and self discharge are improved by a method which is low in cost, that is, by dispersing a solid antacid agent in the capacitor. That is, the electric double layer capacitor of the present invention has activated carbon polarizing electrodes and non-water-based electrolyte solution, and further contains an antacid agent in the capacitor.

By the present invention, since the antacid agent is contained in the capacitor, an acidic material that is a causative material of decomposition of the electrolyte solution and which is generated and accumulated accompanied by repeated charge and discharge of the electric double layer capacitor, can be neutralized. As a result, gas generation caused by decomposition of electrolyte solution can be minimized.

By the electric double layer capacitor of the present invention, gas generation caused by decomposition of solvent of an electrolyte solution is reduced, and a capacitor in which initial efficiency, efficiency maintaining ratio, and reliability are superior and having high energy density can be provided.

EMBODIMENT OF THE INVENTION

Figure 1:
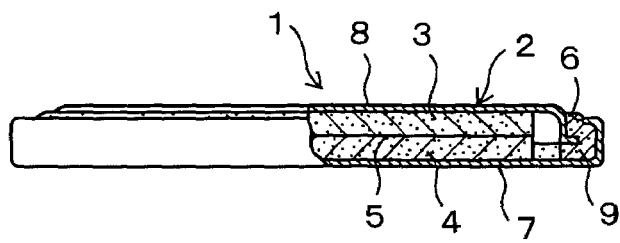
FIG. 1 is a partial cross sectional drawing of a button type electric double layer capacitor which is an example of an electric double layer capacitor.

A preferred embodiment of the electric double layer capacitor of the present invention is explained below.

As an antacid agent used in the present invention, a material which consumes $H^+$, such as a base which reacts and generates $H_2O$, or a material which absorbs $H^+$, such as metal carbonates, basic hydroxides or silicates can be mentioned. Practically, as the metal carbonates, potassium carbonate, sodium carbonate, lithium carbonate and calcium carbonate can be mentioned, and as the basic hydroxides, magnesium hydroxide, calcium hydroxide and lithium hydroxide can be mentioned, and as the silicates, sodium silicate, aluminum silicate and magnesium silicate can be mentioned. Furthermore, as another material, a mineral mainly containing silicates, or calcium oxide can be mentioned.

In particular, an antacid agent having low hygroscopic characteristics and low deliquescent characteristics is desirable. An effective amount added is in a range from 1 to 50% by weight of the activated carbon, desirably in a range from 5 to 50% by weight, and more desirably in a range from 5 to 20% by weight. If the content is less than 1% by weight, antacid effect of $H^+$ is not sufficient and substantial gas minimizing effect cannot be obtained. If the content is more than 50% by weight, internal resistance is increased, and at the same time, a ratio of the antacid agent in the electrode is too high and a ratio of the activated carbon per electrode volume is reduced, and as a result, capacitance per cell volume is reduced. To add and disperse the antacid agent inside the capacitor, it can be desirably dispersed at outer surfaces of activated carbon particles or inside the electrode forming body, not in voids of macropores, mesopores, and micropores or the like, and furthermore, it can be dispersed in a separator.

There is a method in which the antacid agent is mixed in the electrolyte solution; however, uniformity of the antacid agent in the electrolyte solution is difficult to maintain. Therefore, it is difficult to uniformly add the antacid agent in the capacitor inside, and if the antacid agent enters into the voids, internal resistance is increased, that is, efficiency is undesirably deteriorated. To obtain high gas restraining effect in low cost, it is desirable that the activated carbon and the antacid agent be mixed together in powder condition, to form electrode. It is desirable that the antacid agent be mixed and dispersed; however, even if it is not mixed and dispersed, the gas restraining effect can be obtained as long as reducing of $H^+$ is possible.

A mechanism of minimizing the effect of decomposition of the electrolyte solution is believed to be as follows. In the capacitor, $BF_4^-$ is attracted to water remaining in voids of the activated carbon during charging, and they react to generate HF by hydrolysis in a reaction site of the voids of activated carton of positive electrode. The generated $H^+$ behaves as a catalyst of decomposition reaction of PC. At the same time, $H^+$ migrates to the negative electrode to generate hydrogen, thereby increasing leakage current. In this way, self-discharge is increased, or an electrochemical oxidizing reaction is promoted, promoting gas generation reactions. One reason the present invention is effective is that the decomposition rate of the electrolyte solution solvent is reduced by neutralizing the generated $H^+$ catalyst, thereby reducing self-discharge and generated amount of decomposition gas, and thereby improving initial efficiency and durability. If the neutralization occurs in the voids, water is undesirably generated again. Therefore, it is desirable that the neutralization occur on the surface of activated carbon particles, among activated carton particles in the electrode, in electrolyte solution bulk, and the like.

In particular, significant effect can be obtained in the case in which an alkali activated carbon, in particular the alkali activated carbon of graphitizable carbonaceous material is used. The reason for this is believed to be that the void width is small and the surface of carbon is mainly composed of edge surfaces; therefore, water which is strongly absorbed cannot be eliminated, and the absorbed amount of water varies. Therefore, in particular among the activated carbon of graphitizable carbonaceous materials, an activated carbon having many micropores and having low specific surface area (not more than 1000 $m^2/g$), in particular an activated carbon having specific surface area in a range from 100 to 800 $m^2/g$, exhibits significant effect of reducing decomposition of electrolyte solution.

As a method to mix the antacid agent and the activated carbon, a dry type method and a wet type method can be mentioned. In the wet type method, an antacid agent having poor water solubility, for example, magnesium hydroxide, is dispersed in water, and activated carbon is mixed therein to make a slurry which is dispersed and mixed. In the wet type method, a water solution of an antacid agent having strong deliquescent characteristics, for example, calcium oxide, calcium hydroxide, potassium hydroxide, sodium hydroxide or the like, is undesirable since water easily remains in activated carbon or electrodes even if sufficient drying is performed on the slurry.

It is desirable that the particle diameter of the antacid agent be not more than that of activated carbon, since the antacid agent will enter between the activated carbon particles, and capacitance per electrode volume will not be reduced even if the added amount is increased. The average particle diameter of the antacid agent is not more than 100 µm, desirably not more than 10 µm, and more desirably about 1 µm.

Since the acidic material due to the decomposition of the electrolyte solution is generated in the positive electrode, sufficient effect can be obtained by adding the antacid agent to the positive electrode. Therefore, from the viewpoints of cost and production process, the antacid agent is not necessary in the negative electrode.

In Example, anhydrous $K_2CO_3$>99.5% produced by NACALAI TESQUE, Inc. was used as the antacid agent. This was pulverized, mixed with activated carbon, conductive agent and binder, and screened through a screen with holes 100 µm in diameter.

Other constitutional elements of the electric double layer capacitor of the present invention are further explained below.

Activated Carbon Electrode

As a carbonaceous material for an activated carbon electrode in the present invention, graphitizable carbonaceous material produced from mesophase pitch, petroleum oil or coal cokes is used, and the alkali activated carbon is made from the graphitizable carbonaceous material. As a carbon material, mesophase pitch, in particular distillation pitch such as ones which are petroleum oil based or coal based, coke containing the pitch, needle coke, chemically synthesized pitch, PVC pitch, or the like is desirable. By alkali activating these carbonaceous materials, activated carbon which is used in the present invention is obtained. Practical alkali activating method is disclosed in, for example, Japanese Unexamined Patent Application Publication No. 2002-15958, No. 2002-134369, No. Hei 09-275042, and No. Hei 10-121336. Furthermore, an activated carbon activated by a steam activation or a chemical activation can be used. In Examples of the present invention, an activated carbon in which pitch is heat-treated to obtain graphite carbonaceous material and the material is activated by potassium hydroxide and is then sufficiently washed, was used. Practically, the alkali activated carbon in which specific surface area is 790 m$^2$/g, micropore volume measured by t-plot method is 0.34 ml/g, amount of functional group of total surface measured by titration method is 0.7 meq/g, K amount in the activated carbon is 100 ppm and average particle diameter is 10 µm, which is disclosed in Japanese Unexamined Patent Application Publication No. 2002-134369, was used to produce electrodes, and evaluation was performed.

Electrolyte Solution

The present invention is effective for an electrolyte solution in which an aprotic solvent and an electrolyte having anions generating H$^+$ by hydrolysis or the like are mixed. As such an anion, in particular, $BF_4^-$, $PF_6^-$, $(HF)_n^-$ (n is 2 or 3) or the like is desirable, and as a cation, quaternary ammonium cation, pyrrolidinium cation such as dimethyl pyrrolidinium, methylethyl pyrrolidinium, diethyl pyrrolidinium or the like, alkyl imidazolium cation such as ethylmethyl imidazolium or the like disclosed in Japanese Unexamined Patent Application Publication No. Hei 08-250378 is desirable.

It is desirable that the concentration of salt in the electrolyte solution be in a range of from 0.8 to 6.0 mol/L to maintain an ion amount necessary to form an electric double layer, and to obtain sufficient electrical conductivity. These electrolytes can be used alone or in a mixture of several kinds. As a polar solvent, cyclic carbonates such as ethylene carbonate, propylene carbonate, butylene carbonate or the like, straight chain carbonates such as dimethyl carbonate, ethylmethyl carbonate, diethyl carbonate or the like, and sulfur-containing organic compounds such as sulfolane, 3-methylsulfolane, ethylene sulfite can be mentioned. A carbonate derivative of these solvents containing substituants such as chlorine or fluorine can be used. The polar solvent used in the present invention can be used alone, or in a mixture as disclosed in Japanese Patent No. 3156546.

In the present invention, a 1.8 mol/L propylene carbonate solution of triethylmethylammonium tetrafluoroborate [$(C_2H_5)_3CH_3NBF_4$] was used. The amount of water in the electrolyte solution prepared was confirmed to be not more than 30 ppm.

Capacitor Cell Case

For the case for the electric double layer capacitor of the present invention, one of any shape, such as a cylinder, cube, or cuboid can be used. In the case in which a cylindrical case is used, positive and negative electrodes are formed on both surfaces of a collector sheet, the collector sheet is rolled with a separator and is put in a cylindrical case. In such a rolled-type device structure, the size of the device can be freely changed by controlling the width and length of the electrodes. Furthermore, by rolling strongly, the electrodes in the device can be compressed and the filled ratio of activated carbon can be improved. This cylindrical cell has an improved energy density per volume Wh/L. The structure of the capacitor cell is not particularly limited, and in the case in which a cubic or cuboid case is used, electrodes are stacked and inserted into the case. In this case, the volume efficiency of the capacitor module in which plural cells are connected can be improved compared to the cylindrical case. As a material of the case in which the device is inserted, any kind of material can be used; however, volume change during charging and discharging of not more than 1% is desirable, and practically, Al, Ti, Mg, Fe, Cr, Ni, Mn, Ca, Zr, or an alloy containing at least one of these metals can be used.

EXAMPLES

The electric double layer capacitor of the present invention is further explained by way of Examples and Comparative Examples.

Examples 1

Activated carbon having a specific surface area of 790 m$^2$/g, micropore volume by t-plot method of 0.34 ml/g, an amount of surface functional group by titration method of 0.7 meq/g, an amount of K in the activated carbon of 100 ppm and an average particle diameter of 10 µM, and $K_2CO_3$ of 100 µm mesh under were sufficiently mixed in a mortar in a ratio of 85.5:4.5. Furthermore, 5 parts of Denkablack (conductive filler) and 5 parts of polytetrafluoroethylene binder (PTFE) to the above-mentioned ratio were added. The mixture was kneaded and rolled to obtain a sheet electrode having a forming density of the electrode of 0.81 g/cm$^3$ and thickness of 140 µm, and the sheet electrode was used as a positive electrode and a negative electrode of Example 1.

Example 2

Except for the composition ratio in the electrode (alkali activated carbon:$K_2CO_3$:Denkablack:PTFE) which was set to 81:9:5:5, a sheet electrode having a forming density of the electrode of 0.83 g/cm$^3$ and a thickness of 140 µm was produced in a manner similar to that of Example 1, and the sheet electrode was used to prepare a positive electrode and a negative electrode of Example 2.

Example 3

Except for the composition ratio in the electrode (alkali activated carbon:$K_2CO_3$:Denkablack:PTFE) which was set to 76.5:13.5:5:5, a sheet electrode having forming density of the electrode of 0.85 g/cm$^3$ and thickness of 140 µm was produced in a manner similar to that of Example 1, and the sheet electrode was used to prepare a positive electrode and a negative electrode of Example 3.

Example 4

Except for the composition ratio in the electrode (alkali activated carbon:$K_2CO_3$:Denkablack:PTFE) which was set to 63:27:5:5, a sheet electrode having a forming density of the electrode of 0.88 g/cm$^3$ and a thickness of 140 µm was produced in a manner similar to that of Example 1, and the sheet electrode was used to prepare a positive electrode and a negative electrode of Example 4.

Comparative Example 1

The same activated carbon, Denkablack, and PTFE as used in Example 1 were kneaded in a ratio of 90:5:5 and rolled to obtain an electrode sheet having a forming density of the electrode of 0.8 g/cm$^3$ and a thickness of 140 µm, and the electrode sheet was used as a positive electrode and a negative electrode of Comparative Example 1.

Example 5

Except for water activated carbon (trade name: BP20, produced by KURARAY CHEMICAL CO., LTD.) was used, and except for the composition ratio in the electrode (water vapor activated carbon:$K_2CO_3$:Denkablack:PTFE) which was set to 74:10:10:6, a sheet electrode having a forming density of the electrode of 0.74 g/cm$^3$ and a thickness of 140 μm was produced in a manner similar to that of Example 1, and the sheet electrode was used to prepare a positive electrode and a negative electrode of Example 5.

Comparative Example 2

The same activated carbon, Denkablack, and PTFE as used in Example 5 were kneaded in a ratio of 84:10:6 and were rolled to obtain an electrode sheet having a forming density of the electrode of 0.68 g/cm$^3$ and a thickness of 140 μm, and the electrode sheet was used as a positive electrode and a negative electrode of Comparative Example 2.

Performance Measurement and Evaluation

The activated carbon electrode sheets obtained above were arranged on both surfaces of rectangular collector sheets of aluminum foil by a conductive adhesive. In this way, a positive electrode and a negative electrode were prepared, and these electrodes were rolled with a separator to prepare a device. This device was inserted into an Al cylindrical case having a diameter of 40 mm and a length of 120 mm. A terminal part was welded to seal it, and a capacitor cell was obtained.

The cylindrical capacitor cell was dried in a vacuum at 200° C., and the electrolyte solution was filled in this cell. Then, an aging treatment of applying a constant voltage of 2.7 V was performed for 6 hours at 65° C. Constant current discharging of 30 A was performed by an energy equivalent method, and initial capacitance and initial internal resistance of the capacitor were measured. The measurement results are shown in Table 1.

Capacitor cells of Examples and Comparative Examples were put in a constant temperature oven maintained at 65° C., a voltage of 2.7 V was applied to these capacitor cells, and the cells were maintained in this condition for 1000 hours to perform an accelerated endurance test. After the test, the temperature of the cells was decreased to 25° C. to measure capacitance. Capacitance maintaining ratio after the endurance test compared to initial efficiency was calculated by an energy exchange method. The results are shown in Table 1 as "Capacitance after 1000 hr" and "Capacitance maintaining ratio".

The amount of gas generated was measured as follows. Internal pressure of a cell after the endurance test was increased by gas generated. Therefore, a syringe was inserted into the cell and the generated gas was removed until the internal pressure returned to normal pressure. The amount of gas collected in the syringe was defined as the amount of gas generated by decomposition. Self-discharge characteristics were measured as follows. Before the voltage applying test, a cell was charged by CCCV charging at 2.7 V for 3 hours. Terminals were opened, and the cell was held at 25° C. for 72 hours. Then, the difference between the remaining voltage of the cell and the initial voltage 2.7 V was measured. The results are shown in Table 1.

Figure 2:
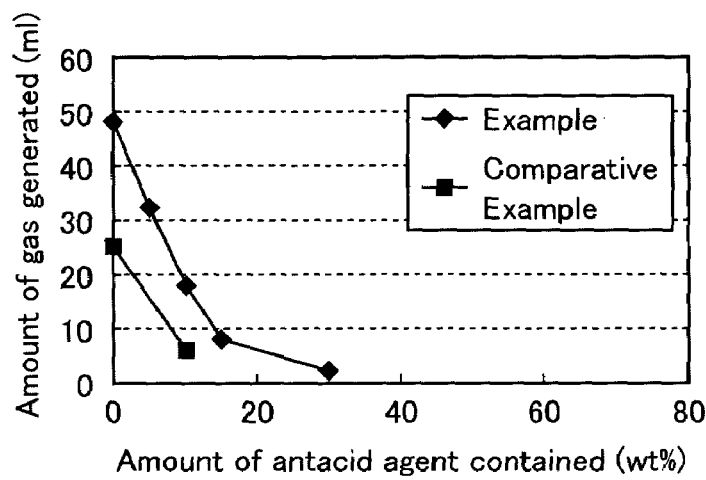
FIG. 2 is a graph showing a relationship of the amount of gas generated and the amount of antacid agent contained in the Example and Comparative Example.
Figure 3:
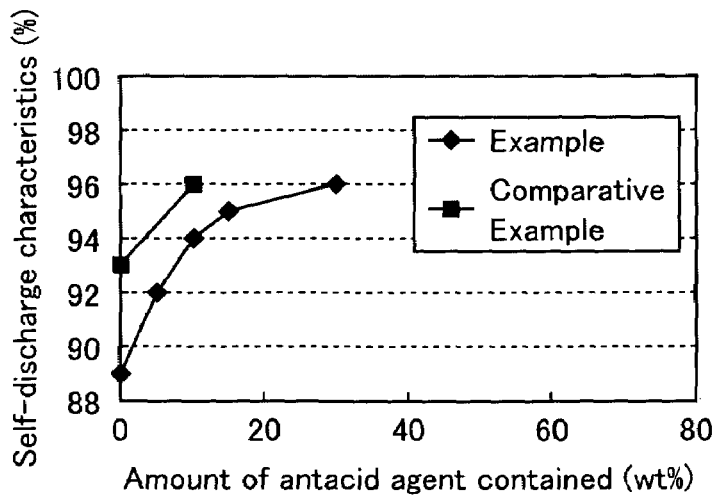
FIG. 3 is a graph showing a relationship of the self-discharge characteristics and the amount of antacid agent contained in the Example and Comparative Example.
Figure 4:
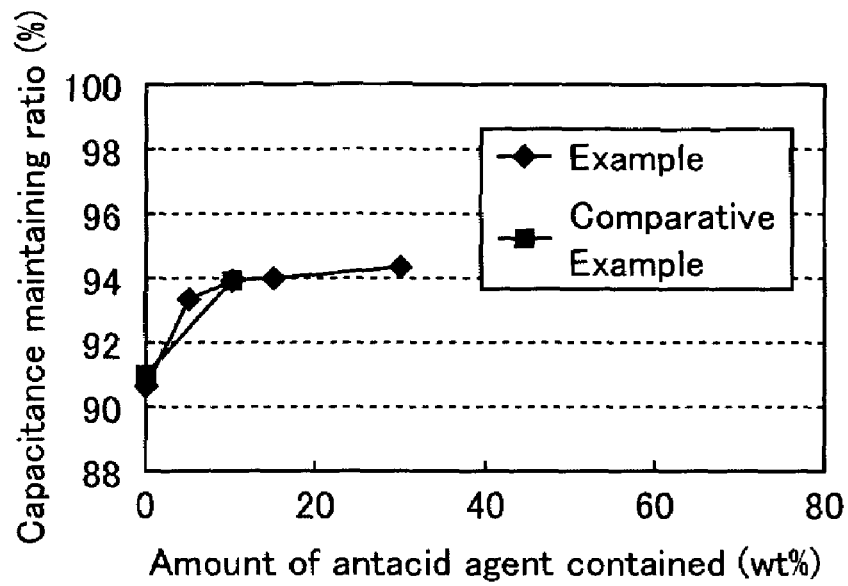
FIG. 4 is a graph showing a relationship of the capacitance maintaining ratio and the amount of antacid agent contained in the Example and Comparative Example.
Figure 5:
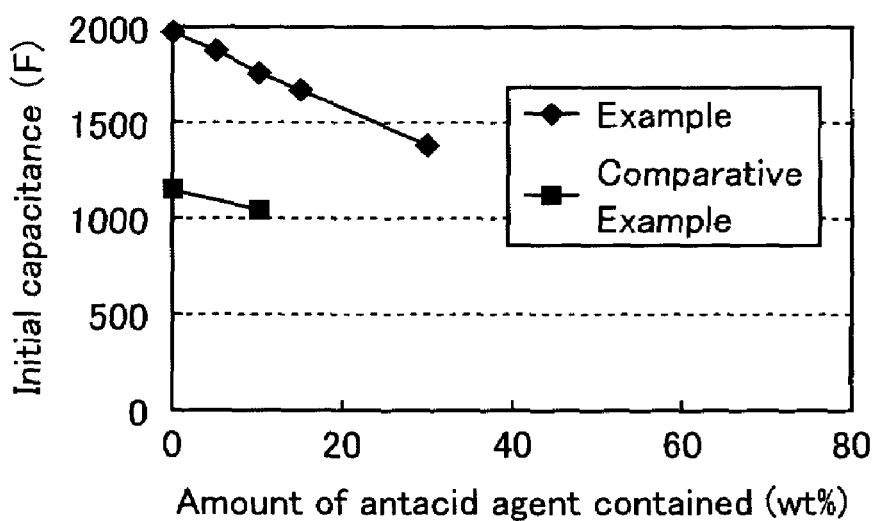
FIG. 5 is a graph showing a relationship of the initial capacitance and the amount of antacid agent contained in the Example and Comparative Example.

Furthermore, graphs showing relationships of each measured value in Examples and Comparative Examples mentioned above and contained amount of antacid agent, are shown in FIGS. 2 to 5.

TABLE 1

| | Activated carbon | Amount of antacid agent (wt %) | Initial internal resistance (mΩ) | Initial capacitance (F) | Self-discharge characteristics (%) | Capacitance after 1000 hr (F) | Capacitance maintaining ratio (%) | Amount of gas (ml) generated |
|---|---|---|---|---|---|---|---|---|
| Example 1 | Alkali activated | 5 | 3 | 1873 | 92 | 1752 | 93.5 | 32 |
| Example 2 | Alkali activated | 10 | 3.1 | 1775 | 94 | 1668 | 94 | 18 |
| Example 3 | Alkali activated | 15 | 3.5 | 1676 | 95 | 1576 | 94 | 8 |
| Example 4 | Alkali activated | 30 | 4 | 1380 | 96 | 1300 | 94.2 | 2 |
| Comparative Example 1 | Alkali activated | 0 | 3.3 | 1972 | 89 | 1791 | 90.8 | 48 |
| Example 5 | Water vapor activated | 10 | 2.6 | 1040 | 95 | 978 | 94 | 6 |
| Comparative Example 2 | Water vapor activated | 0 | 2.9 | 1156 | 93 | 1052 | 91 | 25 |

As is clear from Table 1 and FIGS. 2 to 5, the self-discharge characteristics and capacitance maintaining ratio are improved and the generated amount of gas is reduced by adding the antacid agent (potassium carbonate). Furthermore, similar experiments were performed by using sodium carbonate, calcium carbonate and sodium hydrogen carbonate instead of potassium carbonate, and similar results were obtained.

As is explained above, the electrolyte solution for an electric double layer capacitor of the present invention can reduce gas generation due to decomposition of the electrolyte solution at low cost. Therefore, an electric double layer capacitor having high energy density and superior reliability can be obtained.

What is claimed is:

1. An electric double layer capacitor comprising:
   activated carbon polarizing electrodes;
   a non-water-based electrolyte solution; and
   an antacid agent;
   wherein the antacid agent is solid.

2. The electric double layer capacitor according to claim 1, wherein the antacid agent is contained only in a positive electrode of the activated carbon polarizing electrodes.

3. The electric double layer capacitor according to claim 1 or 2, wherein the antacid agent is at least one selected from solid metallic carbonate salt, solid basic hydroxide, and solid silicate salt.

4. The electric double layer capacitor according to claim 3, wherein the metallic carbonate salt is at least one selected from potassium carbonate, sodium carbonate, calcium carbonate and sodium hydrogen carbonate.

5. The electric double layer capacitor according to claim 1, wherein the antacid agent is contained at 1 to 50 wt % of activated carbon weight of the activated carbon polarizing electrode.

6. The electric double layer capacitor according to claim 1, wherein the antacid agent is contained at 5 to 50 wt % of activated carbon weight of the activated carbon polarizing electrode.

7. The electric double layer capacitor according to claim 1, wherein the antacid agent is contained at 5 to 20 wt % of activated carbon weight of the activated carbon polarizing electrode.

8. The electric double layer capacitor according to claim 1, wherein the size of the antacid agent is not more than the particle diameter of the activated carbon used in the activated carbon polarizing electrode, and wherein the antacid agent is disposed on the surface of the activated carbon particle.

9. The electric double layer capacitor according to claim 1,
wherein the non-water-based electrolyte solution comprises a support salt and an organic solvent dissolving the support salt, and
wherein anion of the support salt is $BF_4^-$.

10. The electric double layer capacitor according to claim 9, wherein the organic solvent is a carbonate ester.

11. The electric double layer capacitor according to claim 1, wherein the activated carbon of the activated carbon polarizing electrode is an alkali activated carbon.

12. The electric double layer capacitor or claim 1, wherein the antacid agent is contained in at least one of the activated carbon polarizing electrodes.

* * * * *